Oct. 21, 1958  R. L. BROOKS  2,857,028
APPARATUS FOR UNLOADING CARS
Filed May 18, 1954
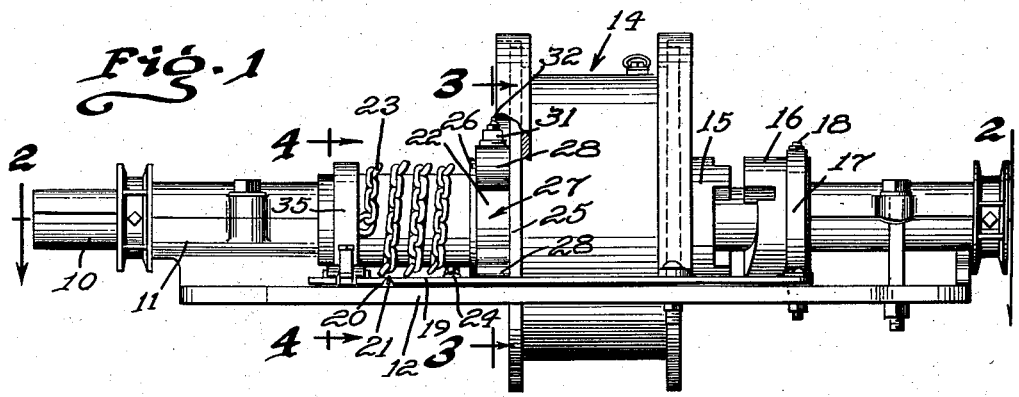
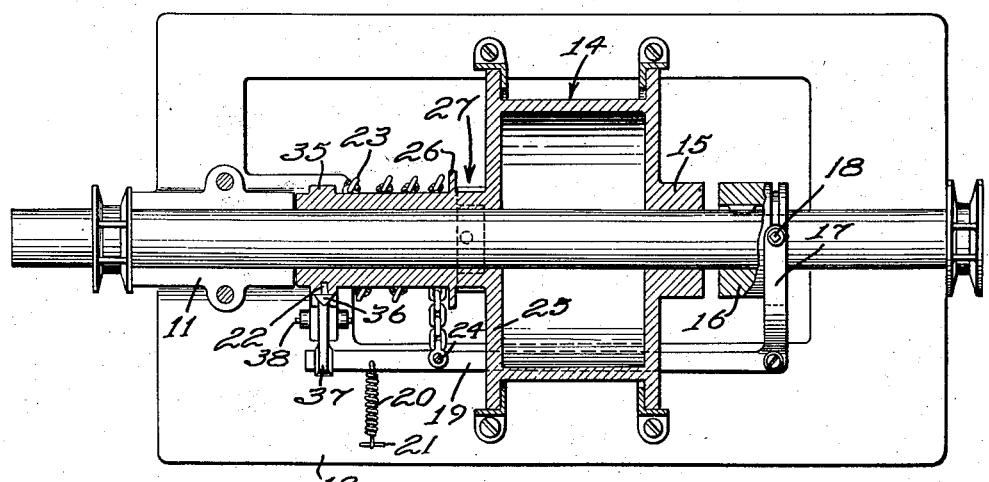
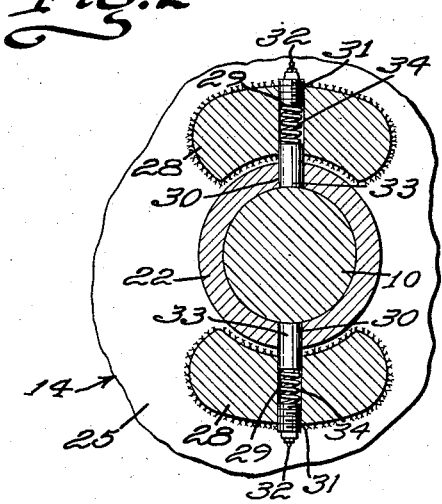
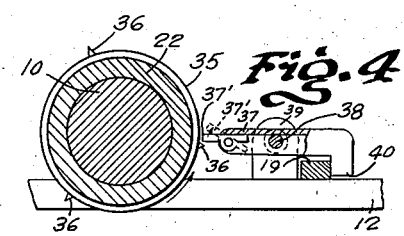
INVENTOR.
Roy L. Brooks
BY Victor J. Evans & Co.
ATTORNEYS

# United States Patent Office 2,857,028
Patented Oct. 21, 1958

2,857,028

APPARATUS FOR UNLOADING CARS

Roy L. Brooks, Kansas City, Mo.

Application May 18, 1954, Serial No. 430,706

1 Claim. (Cl. 192—31)

This invention relates to an apparatus for unloading grain or other bulk material from freight cars, and more particularly to a novel tripping mechanism for a car unloading machine.

Heretofore power shovels for unloading bulk material from cars have used weighted ropes to trip the mechanism on the shovel machines but the use of weight ropes to trip the mechanism on the shovel machines is unsatisfactory because the action is slow and necessitates the pulling of excess cable slack by the operator even though he may be shoveling in the doorway of the car. This slack cable is a hazard to men and equipment since it requires constant replacement of twisted link chains, weight ropes and cable besides the time required to repair the parts and the consequent production losses. To overcome these disadvantages the present invention provides a means whereby the weight ropes are eliminated so that the rope is removed and replaced by two blocks which may be made of cast iron and these blocks rotate with the drum and have arranged in engagement therewith plugs or plungers which are adapted to engage the rotating shaft. As an example of the prior art structure attention is directed to Patent No. 1,794,177 to Johnson, or to the power shovel machines manufactured by the Webster Manufacturing Company of Tiffin, Ohio.

A further object of the invention is to provide a power shovel conversion mechanism which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the power shovel, constructed according to the present invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Referring in detail to the drawings, the numeral 10 designates a shaft which is adapted to be connected to a suitable power source such as a motor (not shown). The shaft 10 is supported by bearings 11 which project upwardly from a horizontally disposed base 12.

Loosely mounted on the shaft 10 is a spool 14, and extending from one side of the spool 14 and secured thereto or formed integral therewith is a first clutch member 15, Figure 2. Slidably mounted on the shaft 10 and keyed thereto is a second clutch member 16, and the clutch member 16 is mounted for movement into and out of engagement with the clutch member 15. A pin 18 connects a yoke 17 to the clutch member 16, and the yoke 17 is part of an actuating lever 19. Thus, when the lever 19 is actuated the clutch member 16 can be moved into engagement with the clutch member 15 so as to cause the spool 14 and shaft 10 to rotate in unison.

A coil spring 20 has one end connected to the lever 19, while the other end of the coil spring 20 is anchored to the base 12 through the medium of a pin 21.

The spool 14 includes a side wall 25, and secured to the side wall 25 or formed integral therewith is a cylindrical sleeve 22 which surrounds a portion of the shaft 10. A chain 23 is trained over the sleeve 22, and one end of the chain 23 is connected to the lever 19 through the medium of a bolt or screw 24. Secured to the sleeve 22 is an annular flange 26, and the flange 26 defines an annular chamber or space 27. In the prior art devices, a weight rope was usually arranged in the space 27, but in the present invention the weight rope is eliminated. As an example of a weight rope attention is directed to members 88 and 90 in Patent No. 1,794,177.

Positioned in the space 27 is a pair of cast iron blocks or body members 28 and each of the blocks 28 is provided with an opening 29 that registers with an opening 30 in the sleeve 22, Figure 3. The blocks or body members 28 are secured to the side wall 25 of the spool 14 in any suitable manner, as for example by welding. Arranged in threaded engagement with each of the openings 29 is a plug 31 which includes a grease filling member 32. Thus, through the medium of the member 32 lubricant such as light grease can be supplied to the interior of the opening 29. Slidably mounted in the openings 29 and 30 is a plug or plunger 33, and the inner end of the plug 33 frictionally engages the shaft 10. A coil spring 34 is interposed between the plunger 33 and the plug 31, and the coil spring 34 biases or urges the plunger 33 into frictional engagement with the shaft 10. By rotating the plug 31, the tension on the coil spring 34 can be adjusted as desired.

In Figure 4 there is shown a tripping mechanism for operating the lever 19, and the tripping mechanism includes an annular rim 35 that is integral with sleeve 22. Projecting outwardly from the rim 35 is a plurality of fingers 36 which are adapted to engage the projecting tongue 37' of a latch 37. The latch 37 is pivotally mounted between a pair of ears 39 by means of a pin 38, and the latch 37 includes a finger 40 which engages the lever 19.

From the foregoing, it is apparent that there has been provided an improvement on a power shovel machine for use in unloading grain or other bulk material from cars such as freight cars. Instead of using a weight rope, the pair of blocks 28 are secured as by welding to the spool 14, and the plugs 33 and 31 are also provided with the spring 34 therebetween. The base 12 provides a rigid support and the friction plugs 33 are adjusted by rotating the plugs 31 so that there will be sufficient friction to trip the latch. The chain 23 is attached to the sleeve 22 and in use the operator pulls the scoop (not shown) backward and inserts the scoop into the grain or other material to be unloaded. When the operator is ready to start unloading the car the engine can be actuated so that the rope will be wound on the spool 14 whereby the scoop will be pulled towards the car door and automatically stopped. The scoop is then drawn back into the car for further unloading action. One end of the rope on the spool 14 is secured to the scoop and the other end of the rope is secured to the spool. The chain 23 is wound around the sleeve 22 and connected to the lever 19. Thus, there is a tendency to keep the clutch members 15 and 16 disengaged from each other. The operation of the motor causes the rope to be wound up on its spool 14 so as to pull the scoop to the door of the car. When the scoop reaches the door, the chain 23 will have been wound again on its drum or sleeve to thereby pull the shifting lever 19 so as to disengage the clutch member 16.

Previously weight ropes were used to trip the mechanism on the shovel machines but this action is slow and requires the pulling of excess cable slack by the operator even though he may be shoveling in the doorway of the car. This slack cable is a hazard to men and equipment as it requires constant replacement of the twisted link chain, weight ropes and cable, as well as time lost in repairing and production losses. With the present invention the weight ropes are eliminated. Thus, the rope in the space 27 is removed and in its place two cast iron blocks 28 are welded to the spool 14. Holes are drilled in these blocks and threaded openings are tapped therein so that normally the plugs 31 are a half inch below the surface of the hole 29. The inner plugs 33 may be recessed for receiving the inner ends of the springs 34 and then the plugs 31 are screwed in far enough to give the desired pressure to cause the spool 14 to rotate with the shaft and thus trip the mechanism at any point desired. The grease fittings 32 permit lubrication to be applied to the working parts so that the parts will not wear out readily.

With the present invention old type shovel machines can be converted by use of the body members or blocks. Since the parts can be lubricated, the materials will stand up longer and various adjustments can be made.

In actual practice the groove 27 is about 2½ inches wide and about 2 inches deep, but these dimensions vary on different makes of shovel machines. The body members 28 do the same thing as the previously used weight and rope but will save much time and also can be quickly and easily adjusted. The inner plugs 33 may be made of bronze and act as a brake against the shaft 10. These inner plugs 33 have about ¾ of an inch of solid metal on the inner end next to the shaft 10 and the other end may be bored so as to receive the springs 34. By screwing down on the plugs 31 against the springs 34, the inner plugs 33 will be forced against the shaft 10 to thereby act as a brake and thus cause the drum or spool 14 to revolve the same as the weight and rope and this adjustment can be effected to a fine degree.

The fingers 36 can engage the member 37′ to selectively pivot the member 37 about the pin 38 so that the finger 40 will be raised whereby the spring 20 can pull the lever 19 back. The shaft 10 rotates continuously in one direction, but the entire drum assembly or spool 14 rotates in the opposite direction when the man in the car pulls the cable which is trained over the spool 14 as the man takes the shovel back into the car. When the person is ready for the machine to pull the shovel he gives the line on the shovel a little slack and the blocks 28 will then start the spool 14 to revolve in the direction the shaft 10 is turning and this will trip the mechanism and engage the clutch member 16 with the clutch member 15. The dog 35, when rotated in the same direction as the shaft 10, will trip the member 37 to release the lever 19 which can then be pulled back by the spring 20 so that the clutch members will become engaged whereby the spool 14 will be rotated. With the spool 14 being rotated, the shovel can be pulled to thereby push the grain out of the car. In order for the spool 14 to rotate and make the dog 35 trip the member 37, the blocks 28 are utilized instead of the weight and rope.

The fittings 32 are filled with light grease. The part 35 is actually a portion or part of the spool 14 and the spool 14 and part 35 are made integrally in one casting. The fingers 36 may be secured to the dog or rim 35 by boring a hole in the edge of this rim, then inserting the finger and putting a pin therethrough.

In order to further explain the operation of the present invention, it is believed desirable at this point to insert a description of how prior devices of a similar nature work. Thus, referring to Figure 2 it will be noted that the words "Left" and "Right" appear and the shaft 10 is coupled solidly to a suitable motor and turns right. The entire spool assembly floats on the shaft 10 and the frame is securely fastened to some kind of a support.

Then, when the shovel board is pulled to the car door, the rope or cable on the spool 14, and the chain 23 are wound to the right onto the spool as far as they will go. The rope with the weight in space 27 on the spool will be wound to the left, and will be let out as far as it will go. When the shovel operator pulls the shovel to the back end of the car as far as he can go, just the opposite will be true. Thus, the cable or rope on the spool 14 will be all the way out and off the spool. The chain 23 will be completely unwound and wound up backwards since the chain 23 is only half the length of the rope or cable on the spool 14. The rope with the weight that goes in the space 27 will be wound on the spool as far as it will go. It is seldom that the rope or cable on the spool 14 has to be pulled all the way out to reach the back end of a car, so that all of the chain 23 will not be completely wound up backwards. There will be a loop hanging down and this gives added weight to the weight on the rope in the space 27. This is why the shovel operator has to give the rope or cable a hard pull in order to unwind enough chain and cable to get this added pull to help the rope and weight in the space 27 turn the spool in the direction the shaft is turning hard enough to trip the member 37 and release lever 19 which engages the clutch members 15 and 16. Thus it will be seen that when the shovel operator is working close to the door, he still must give the rope or cable on the spool 14 a hard pull so as to unwind over half of it in order to get this added weight on the chain to trip the mechanism. This makes a dangerous situation since all of this slack rope or cable is lying around and often machinery has been torn up or men have been killed by this slack rope or cable.

With the present invention the operation just described is the same except that the operation can be controlled more accurately and there is no need for all this previously described slack to hang down on the rope or cable in the spool 14. A foot of slack is sufficient to permit the friction plugs to turn the spool and trip the mechanism. This therefore speeds up the unloading and is easier on the operator, and the pull is no more than needed, and also the rope in the space 27 is eliminated. By eliminating the rope and weight in the space 27, which usually wears out in a short time, there results a simplified installation of the chain 23 and rope or cable on the spool 14, since they both wind the same way. Also, the time of installation is cut from about 20 minutes to less than 10 minutes.

Most elevators such as elevators for handling grain from freight cars pulling from two to six or eight cars at a time to unload the cars, and if one car is delayed all of the cars are delayed so that it will be a costly delay in the unloading.

By using two pressure plugs opposite each other, the operation will be improved and a fine adjustment can be effected. The pressure of the spool is always down against the shaft 10, and if only one pressure plug were used and the spool and shaft get loose from wear, such looseness usually resulting quickly since the parts are always operating in heavy dust and dirt, it will not work the same in all positions. Thus, when the pressure plug is directly over the shaft 10, the pressure will be greater than when it is directly under the shaft 10 and a very little looseness will make a great deal of difference as to operation.

With two pressure plugs 30, one on each side as shown in Figure 3, the pressure is always the same, for if one plug is looser the other is tighter and this equalizes itself as the spool turns. The heavy dust and dirt is one reason why a dry pressure plug will not stand up and a dry pressure plug was attempted by Carlson in Patent No. 1,663,292 in Figure 3, but such a dry plug will not work satisfactorily. This shovel machine therefore uses two pressure plugs or friction plugs which run in grease.

The sleeve 22 is cast integral with the drum or spool

14. The latch 37 and finger 40 are of one piece construction. When the fingers 36 travel in a clockwise direction, Figure 4, the fingers 36 cause the latch 37 to pivot in a counterclockwise direction, Figure 4, so that the member 40 is raised and then the lever 19 moves back and the member 40 rests on top of the lever 19.

The motor and shaft may travel in a clockwise or counterclockwise direction, depending upon which end of the shaft the motor is on. In Figure 1 the chain 23 is shown wound in the proper direction to be completing its pull and the clutch dogs 15 and 16 have just separated. In this position the shaft would still be turning but the drum assembly has stopped. Facing the drawing, if the motor were on the right end it would have to be turned counterclockwise. If it were on the left end it would be turning clockwise to get the same rotation of the shaft. The numeral 16 indicates a sliding member, and the members 10 and 16 are slotted equal depths for a heavy key and this is the driving power of the machine. Movement of the member 19 engages or disengages the members 15 and 16, and the member 16 turns continuously with the member 10 but will slide on the key and shaft.

The chain 23 fastens to the arm 19 by means of a bolt or hook at a suitable position, and a spring or weight may be fastened on the outer end of the arm 19, and the opposite end of the spring is fastened to some other suitable object and this serves to pull back the arm 19 and engage the members 15 and 16 when the latch 37 is tripped.

The sleeve 22 is cast integral with the drum 14, and the parts 37 and 40 are of one piece integral construction and are part of the same lever. When the finger 36 pushes the tongue 37' down, the finger 40 is raised and then the arm 19 moves back so as to engage members 15 and 16, and the member 40 rests on top of the member 19 which lowers the latch 37 far enough so that the fingers 36 will not strike it when turning counterclockwise. Furthermore, the part of latch 37 which finger 36 strikes is a tapered flat tongue 37' about 1½ inches long with a pin through one end. This leaves the outer end of the tongue 37' free to flip up and cause no action when the finger 36 is rotating in the opposite direction as it will when pulling cable off the drum. The latch 37 is hollowed out to take this tongue 37', Figure 4, and has a projecting under lip so that the tongue 37' rests on it when standing straight out. The tongue 37' is a small part of the latch 37 which the finger 36 strikes and it is actually a separate part or unit of the member 37.

The following is a description of a complete cycle of operation. In Figure 1 of the drawing a cycle has just been completed and it is ready to start over. With the motor at the right side of the end of the shaft 10, at this position the chain 23 is completely wound on the drum which has pulled the lever 19 in and disengaged the members 15 and 16. A ⅜ inch cable which is normally used on the drum 14 is wound on the drum its limit. The point this pulling operation is stopped, is determined by what point the chain 23 comes tight. The shaft 10 turns the same direction at all times and is continuous which is counterclockwise. The operator starts back in the car pulling the ⅜ inch cable off of the drum 14, and the drum rotates clockwise, and slippage occurs on the shaft 10. As long as the ⅜ inch cable is kept right and no slack is given, the clutch will not engage. As the ⅜ inch cable is being pulled off of the member 14, the chain 23 is also unwinding. When the operator gets as far in the car as desired and wishes to start to pull out, he gives the ⅜ inch cable a light quick pull which causes a foot or so of slack cable to unwind from the drum 14 and this leaves the drum 14 free to rotate counterclockwise through the braking action against the shaft 10. As the drum 14 starts its rotating action, it will cause the finger 36 to strike the tongue 37' of the lever 37 and raise the finger 40. A spring on the outside of the lever 19 pulls the lever 19 out and engages members 15 and 16. The drum 14 rotates with the shaft 10. The chain 23 will wind on its drum as will the ⅜ inch cable on the drum 14. When the chain 23 winds up it will draw in the clutch arm 19 so as to disengage members 15 and 16 and complete the cycle. When the chain 23 is unwound from the drum, it hangs down in a loop under the machine and one end thereof is fastened to the arm 19.

I claim:

In an operator for a power shovel, a base, bearings extending upwardly from said base and secured thereto, a shaft supported by said bearings and adapted to be connected to a power source, a spool loosely mounted on said shaft and adapted to have a shovel cable trained thereover, clutching elements interposed between the spool and said shaft, said spool having a side wall, an elongated sleeve connected to said spool, an annular flange extending from said sleeve and secured thereto, said flange defining on one side thereof a spool wall and on the other side thereof a chamber, friction means including a pair of diametrically opposed guide body members secured to the sidewall of said spool and positioned in said chamber, there being registering openings in said guide body member and sleeve, a plug arranged in threaded engagement with the opening in the guide body member, plungers slidably mounted in said registering openings and frictionally engaging said shaft and being of a length to extend from the guide body member through the sleeve into contact with the shaft, and a coil spring interposed between said plunger and plug, said plugs being provided with grease filling openings.

References Cited in the file of this patent

UNITED STATES PATENTS

| | | |
|---|---|---|
| 1,663,292 | Carlson | Mar. 20, 1928 |
| 1,794,177 | Johnson | Feb. 24, 1931 |